United States Patent [19]

Suzuki

[11] 4,187,768
[45] Feb. 12, 1980

[54] METHOD FOR THE MANUFACTURE OF A PAPER CONTAINER

[75] Inventor: Shoichi Suzuki, Tokyo, Japan

[73] Assignee: Nihon Dixie Company, Limited, Tokyo, Japan

[21] Appl. No.: 885,259

[22] Filed: Mar. 10, 1978

[30] Foreign Application Priority Data

Nov. 15, 1977 [JP] Japan .................................. 52-137184
Nov. 28, 1977 [JP] Japan .................................. 52-142370

[51] Int. Cl.² .......................... B31B 1/66; B31B 17/02
[52] U.S. Cl. .................................. 93/39.1 R; 53/379;
93/DIG. 1; 93/36.5 R; 156/73.1; 156/380;
156/580.1
[58] Field of Search ........ 93/39.1 R, DIG. 1, 55.1 R,
93/36.5; 156/73.1, 380, 580.1; 53/175, 373, 379;
229/5.6

[56] References Cited

U.S. PATENT DOCUMENTS

| 2,032,343 | 3/1936 | Arthur | 93/DIG. 1 |
| 2,725,001 | 11/1955 | O'Neil | 93/55.1 R |
| 3,336,847 | 8/1967 | Durat | 93/36.5 X |
| 3,439,590 | 4/1969 | Rosenberg et al. | 93/55.1 R |
| 3,956,975 | 5/1976 | Egleston et al. | 93/DIG. 1 |

Primary Examiner—Z. R. Bilinsky
Attorney, Agent, or Firm—Frishauf, Holtz, Goodman and Woodward

[57] ABSTRACT

A method for economically manufacturing a water-resistant paper container having a thermoplastic film coating on the inner and/or outer wall surfaces by means of an ultrasonic wave welding technique. The paper container can be economically manufactured by the utilization of an ultrasonic wave welding technique without the use of any adhesive. According to the method of the present invention, a bottom panel and a body member can be interruptedly joined together at the interface between the panel and the container body. As a result, the inner wall surface of the container can be easily and rapidly lined with a thermoplastic film by a known method. Furthermore, according to the present invention, a container mouth edge which is capable of resisting to any deforming stress can be formed.

14 Claims, 4 Drawing Figures

METHOD FOR THE MANUFACTURE OF A PAPER CONTAINER

BACKGROUND OF THE INVENTION

This invention relates to a method for the manufacture of a water-resistant paper container and more particularly, to a method for economically manufacturing a water-resistant paper container having a thermoplastic film layer on the inner wall and/or the outer wall surfaces of the container by means of ultrasonic wave welding.

Hitherto, there has been a great deal of demand for a paper container which can store a liquid or high water-content product such as milk, yogurt or the like for a long period of time without the container contents leaking and/or soaking into the paper and which can be simply and economically manufactured. Said leakage and soaking impair the strength or appearance of the container. However, to date, no container which can satisfactorily comply with such demands of users has been obtained. It has been known that a highly water-resistant paper container can be obtained if the interior and/or exterior wall surfaces of the paper container are covered with a thermoplastic film such as polyethylene film, polypropylene film or the like. Especially, a paper container lined on the interior wall surface with a thermoplastic film and coated on the exterior wall surface with the same or similar film has extremely high water-resistance for the reason that there are no uncoated portions on the interior wall surfaces of the container, and therefore, the contents of the container can not penetrate into the paper or leak outside and the plastic film coated on the exterior wall surfaces of the container protects the outer surface of the container against moisture attack. Thus, this type of paper container is most preferable for storing liquid-like products. In fact, such a container is free of such problems as penetration of the contents of the container into the paper, leakage of the contents from the container and impaired strength of the container, even after it has held the contents for a very long period of time. Also, since the exterior wall surface of the container is coated with a thermoplastic film such as polyethylene film, atmospheric moisture can not penetrate even when the container is placed in a highly humid environment, for example, in a refrigerator, and therefore, the strength of the container is not affected by the moisture. However, the manufacture of this type of container has encountered some inherent technical difficulties.

For example, the conventional method for manufacturing such a container coated on the exterior wall surface with a thermoplastic film uses a suitable adhesive for joining the container body portion and the container bottom panel together. More particularly, in the adhesive bonding of the container body portion and the container bottom panel, the adhesive is applied in a strip form to the uncoated paper surface of the container body blank, which is to be the inner wall of the container, slightly above the lower end of the blank; the peripheral flange of the bottom panel formed by downwardly bending the outer peripheral edge of the bottom panel at right angles to the plane of the bottom panel is positioned on the adhesive layer coated on the paper surface of the body blank; the lower end of the container body blank is inwardly and upwardly bent around the peripheral flange of the bottom panel so as to encompass said peripheral flange of the bottom panel with the inwardly and upwardly bent flange of the container body to thereby form a bottom seam; and then the so-formed bottom seam portion is mechanically clamped on both sides of the seam to firmly join the container body member and the bottom panel together. Therefore, the interior wall surface of the so-formed container member is lined with a thermoplastic film by a known method, for example, the plug-assist forming method or the plug-assist blow forming method. In each method, a preheated and softened sheet of the thermoplastic film is positioned across the opening of the container so as to hermetically seal said opening, said sheet is then pressed down into the interior of the container by the plug, and then after the plug has reached its dead point, vacuum forming means or pressure forming means is applied to the container to thereby manufacture a container lined with the thermoplastic film. However, in order to achieve the firm contact of the film with the whole inner wall surfaces of the container in each method, the air entrapped in the enclosed space defined by the lining film and the inner wall surface of the container member need be removed from the space. Heretofore, the entrapped air has been removed from the container through the bottom seam portion of the container. However, where an adhesive is used for bonding the peripheral flange of the bottom panel and the container body wall, the two components are adhesively joined together at the whole area of the interface between the components so that there are very few voids in the bottom seam portion through which the entrapped air can be evacuated. Accordingly, air exhausting will require a rather long time which makes it difficult to manufacture a water-resistant paper container in a commercially acceptable period.

Furthermore, the conventional method referred to hereinabove also employs an adhesive in the formation of the container body member. That is, an adhesive is applied in a strip form to one cut end of the container body blank, which is coated on the exterior side with the thermoplastic film, in the longitudinal direction of the end and then the blank is rolled into a cylindrical shape so as to bring the opposite cut ends of the blank into slightly overlapping relationship to thereby form an adhesively bonded side seam which extends in the longitudinal direction along the container body wall. However, in this method, the paper surfaces are not bonded together by the adhesive, but the paper face and the film face are bonded together by the adhesive, so that, the bond strength between the film face of one end of the blank and the paper face of another end of the blank is not so high and, therefore, the side seam formed by bonding the film face and the paper face with the adhesive is weak and the two faces tend to easily separate from each other.

Moreover, in the conventional manufacturing procedure of the paper container, before or after the step of lining the inner wall surfaces of the container member with the thermoplastic film, the outer upper periphery and its vicinity of the container side wall is heated by suitable means to slightly soften the same, and then the so-softened upper periphery of the side wall is outwardly curled or bent so as to form a mouth edge or rim of the container, preferably with a horizontal upper end. The purpose of providing the curled mouth edge with the horizontal upper end is to facilitate hermetical sealing of the container filled with contents such as liquid foods or the like by joining at said mouth edge of the container with a lid member formed of a sheet material of a thermoplastic film such as polyethylene film or of a composite sheet of such film and a metal foil such as an aluminum foil. However, the conventional method for forming the mouth edge of the container merely consists of outwardly curling and mechanically clamping the curled flanges and does not include any step or means for bonding the curled flanges together. As a result, as time elapses after forming the mouth edge of the container, the curled flanges of the mouth edge are apt to gradually turn back to the previous uncurled state, thus giving the container a deformed mouth edge. However, the deformed mouth edge is a cause of decreased production efficiency prevents smooth hermetic sealing, for example by heat, of the container with the lid member after the container is filled with its contents.

SUMMARY OF THE INVENTION

Therefore, one object of the present invention is to provide a method for economically manufacturing a water-resistant paper container.

Another object of the present invention is to provide a method for treating the container mouth edge that has been formed by curling the upper periphery of the container side wall so that said mouth edge retains its proper shape as formed and will not undergo any deformation thereafter.

Briefly, the above objects of the present invention can be satisfactorily attained by the utilization of ultrasonic welding technique in the manufacture of a paper container.

The above and other object and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

PREFERRED EMBODIMENTS OF THE INVENTION

The present invention will now be described referring to the accompanying drawings which show preferred embodiments of the present invention.

Figure 1:
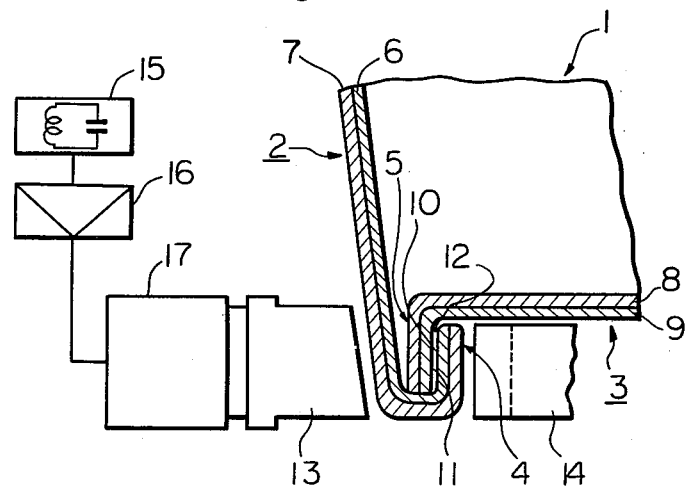
FIG. 1 is an enlarged, fragmentary cross-sectional view showing how to join a container body member and a container bottom panel together by the use of an ultrasonic wave welding set comprising a holder and a metal horn in carrying out the present invention.

Referring to FIG. 1 of the drawings, the ultrasonic wave welding set comprises a metal horn 13 and a holder 14. A paper container member 1 having a coating of a thermoplastic film such as polyethylene film applied to the exterior surface of the container components 2 and 3 as shown in FIG. 1 is formed by steps comprising:

(i) blanking out a bottom panel and a body member from a sheet of paper material having a coating of thermoplastic film applied to the exterior surface of the sheet;

(ii) downwardly bending the peripheral edge of said bottom panel at right angles to the plane of the bottom panel to form a peripheral flange;

(iii) positioning said peripheral flange of the bottom panel slightly above the lower end of said container body blank;

(iv) rolling so as to bring the opposite cut ends of the container body blank into slightly overlapping relationship to thereby form a container body wall having a side seam that extends in a longitudinal direction along the body wall; and (v) inwardly and upwardly bending the lower end of the container body wall along the peripheral flange of the bottom panel so as to encompass said flange of the bottom panel to thereby form a bottom seam of the container. FIG. 1 shows part of the bottom seam portion of the so-formed container member on an enlarged scale. As will be shown in FIG. 1, the body wall portion 2 of the container member 1 comprises an inner paper layer 6 and an outer thermoplastic film layer 7. Similarly, the container bottom panel 3 comprises an upper inner paper layer 8 and a lower outer thermoplastic film layer 9 the material of which is the same as that of the film of the body portion. Thus, the paper surface 10 of the upwardly bent flange 4 of the body portion 2 is opposite the film surface 11 of the peripheral flange 5 of the bottom panel 3. If the above-mentioned bottom seam is positioned between a holder 14 so provided that the edge of the holder contacts the inner periphery of the bottom seam and a metal horn 13 so provided that the edge of the horn contacts the outer periphery of the bottom seam, and an ultrasonic wave is applied to the bottom seam through the metal horn 13, heat is generated only at interface 12 between the film surface 11 of the peripheral flange 5 of the bottom panel 3 and the paper surface 10 of the hook flange 4 of the body portion 2 without affecting the outer film layer 7 of the body portion 2 which directly contacts with the metal horn 13. In consequence, the film surface 11 melts into the paper surface 10 so as to join the container body wall and the bottom panel together.

Figure 2:
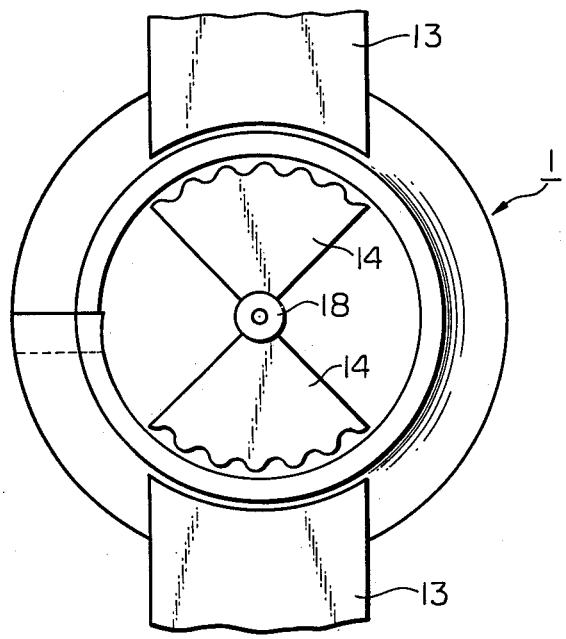
FIG. 2 is a bottom view as seen from the underside of said bottom panel showing how to join said container body member and container bottom panel together by means of holders each having a corrugated edge and horns each having a smooth edge.

The applicant has found that when a holder 14 having a corrugated edge as more clearly shown in FIG. 2 is employed in combination with the metal horn 13 having a smooth edge in the ultrasonic welding step referred to hereinabove, the paper surface 10 and the film surface are welded together only in areas corresponding to the apices of the corrugated edge, but not in areas corresponding to the valleys of the corrugated edge. The configuration of the apices of the corrugated edge may be either curved or flat as desired. As depicted in FIG. 2, two pairs of horn 13 and holder 14 are conveniently set up in a symmetrical relationship with respect to a shaft 18, but equally satisfactory results are obtained if one pair of the horn 13 and the holder 14 is omitted. When the horn or horns and the holder or holders are maintained stationary and the container member is rotated about the shaft by the angular distance of one half of one complete rotation, the areas of the bottom seam joining the container body wall portion and the bottom panel which were left unwelded in the preceding ultrasonic wave welding step can be welded in succession. Alternatively, it is also possible to hold the container member stationary and rotate the horn or horns and the holder or holders along the outer periphery of the above-mentioned bottom seam.

As mentioned hereinabove, when ultrasonic waves are applied to the bottom seam portion of the container by means of the ultrasonic welding set comprising the metal horn having the smooth edge and the holder having the corrugated edge, the bottom panel and the body wall are welded in an interrupted pattern at their interface 12 to thereby effectively provide voids or passages in the bottom seam through which the entrapped air may be discharged. Therefore, if the inner wall surface of the paper container member is lined with the thermoplastic film by the aforementioned methods, the entrapped air in the enclosed space defined by the lining film and the inner wall surface of the container member can be rapidly discharged through the voids, i.e., the unwelded areas present in the bottom seam. As a result, the number of the lined cups produced per unit time can be substantially increased. The lining film can satisfactorily seal the voids present in the bottom seam against leakage of the container contents therethrough. The bond strength between the peripheral flange of the bottom panel and the container body wall provided by the aforesaid ultrasonic welding is sufficiently high to prevent separation of such container components, but, if a higher bond strength is desired, the lining step can be followed by another ultrasonic wave application to the bottom seam portion that joins the container body wall and the bottom panel. In doing so, it is not necessary to use a holder having a corrugated edge; the holder may have a smooth edge.

After the lining step, the upper periphery of the side wall of the container is slightly softened by heating with a suitable heating means and then outwardly curled or bent by the conventional means so as to form the horizontal upper end of the container into mouth edge 19. Therefore, as will be best illustrated in FIG. 3, a holder 21 having a smooth edge is positioned below the mouth edge 19 and a metal horn 23 having an annular groove 22 the shape of which is similar to that of the mouth edge 19 is positioned above the mouth edge so as to clamp the mouth edge 19 between the holder 21 and the metal horn 23. The ultrasonic waves are applied to the mouth edge 19 of the container through the horn 23. Surprisingly, it has been found that when ultrasonic waves are applied to the container mouth edge, heat is generated only at interfaces 24, 25 and 26 defined by facing films c-d, e-f and g-h, respectively, to thereby provide firm welding through fusion of the films. As a result, the curled flanges forming the mouth edge are securely bonded to each other. Accordingly, there is no possibility that the mouth edge once formed by curling or bending the upper periphery of the container body wall will be gradually deformed by the restoring force of said curled flanges toward the previous uncurled state. In this way, a high water-resistant paper container provided with a nondeformable mouth edge and having thermoplastic film layers coated on both the exterior and interior surfaces of the container is provided.

Furthermore, since the film layer of the upper end of the container mouth edge is subject to no change during the application of the ultrasonic wave to the mouth edge, the upper edge of the mouth maintains its smooth appearance. Therefore, heat sealing of the lid member to the mouth edge can be easily carried out after a desired food product or the like has been packed into the container.

In connection with the above-mentioned heat generating property of ultrasonic waves, the inventor has also found that the ultrasonic welding technique can be applied to the manufacture of a container body member out of a blank coated on at least one side with a thermoplastic film. As will be more clearly shown in FIG. 4, the blank for the container body member 2 is rolled into a cylindrical form in the conventional manner using, for example, a known holding mechanism so as to bring the opposite cut ends of the blank into slightly overlapping relationship and then ultrasonic waves are applied to the so-formed overlapped portion while clamping it by means of a metal horn 27 and a holder 28. Heat is generated only at the interface 29 in the overlapped portion, whereby the film 7 present in the overlapped portion is welded to the opposite paper layer 6 to form a firmly bonded side seam extending in a longitudinal direction along the container body wall. Fortunately, in the forming of the side seam in the manner mentioned above, the outer thermoplastic film layer in direct contact with the metal horn 27 is not subject to any deformation but maintains a smooth and fine appearance.

It is preferred to form the bottom seam that joins the bottom panel and the container body wall simultaneously with the side seam that joins both cut ends of the container body blank by application of ultrasonic waves.

Figure 3:
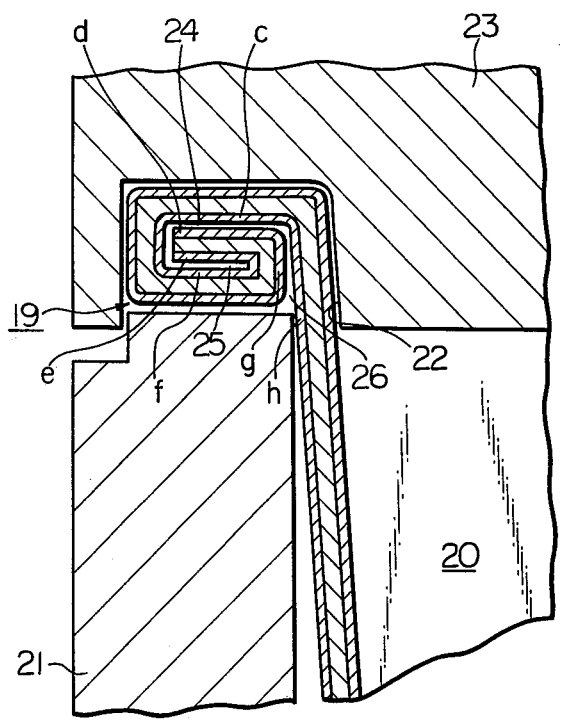
FIG. 3 is an enlarged, fragmentary cross-sectional view showing how to treat the mouth edge of the container by an ultrasonic wave welding set comprising a holder and a metal horn.
Figure 4:
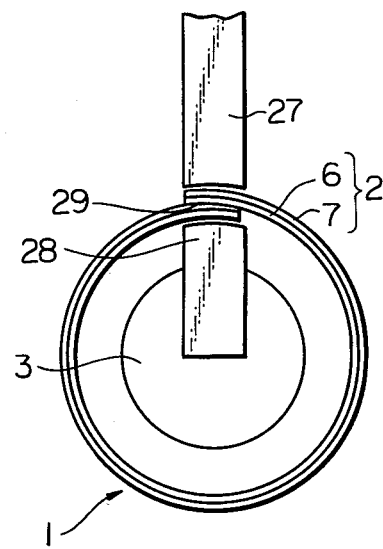
FIG. 4 is a plan view showing how to manufacture said container body by the use of an ultrasonic wave welding set comprising a holder and a metal horn.

It should be understood that FIGS. 2–4 depict the state just before starting the application of ultrasonic waves to the portions to be welded. Therefore, referring back to FIG. 2, for example, it may be understood that in a practical application of ultrasonic waves, a static pressure within the range of from about 1 to 10 Kg/cm$^2$, preferably, in the range of from about 2 to 5 Kg/cm$^2$ is applied through the metal horn 13 to the bottom seam portion to be welded so as to avoid the formation of any gap between the components to be treated. The time for application of ultrasonic waves will be very short and in fact, it may be on the order of from about 0.2 to about 2 seconds. The vibrational amplitude of ultrasonic waves at the edge of the metal horn is from about 20 to 60 $\mu$m, with a range from about 30 to 40 $\mu$m preferred. The horn is formed of metal and has a smooth edge. The horn is used in combination with an electroacoustical transducer 17. The configuration of the edge of the horn may vary depending upon the outer shape of the portions to be welded. Thus, the electroacoustical transducer and horn are designed to be easily detachable from each other. If particularly necessary for the ultrasonic welding treatment as set forth above, an additional stationary horn (not shown) may be interposed between the metal horn 13 and the transducer 17. An electrical signal is produced by an oscillator circuit 15 and amplified by an amplifier circuit 16. Such electric energy is then transmitted to the transducer 17 and converted into a mechanical vibration which resonates the metal horn 13. As a consequence, the plastic film is compressed several ten thousand times per second whereby heat is generated at the interface of the container components to which ultrasonic wave is applied, with the result that the plastic film layer is welded to the opposite paper layer or the plastic film layer at their interface.

It should be noted that the method of manufacturing the paper container according to the present invention can be carried out only in the case where the container member is fabricated from the container body blank and the bottom panel which have a thermoplastic film coat applied to at least one side thereof.

Therefore, as another embodiment of the present invention, in accordance with the present invention, it is possible to provide a paper container not lined with a thermoplastic sheet. Where the container member is not lined with the thermoplastic film, a holder having a smooth edge should be employed in order to weld the bottom seam portion of the container, because no voids should exist in the bottom seam. If they should exist in the bottom seam, there could result a leakage of the container contents through the bottom seam.

As a still further embodiment, in accordance with the present invention, it is also possible to fabricate the paper container so as to have a coating of the thermoplastic film applied to the inner wall surface of the container. Similarly, in this case, a holder having a smooth edge must be used in order to weld the bottom seam portion of the container. It is noted, however, that in such a container, an uncoated cut edge will exist in the inner edge forming the container side seam and if this is left uncoated, the container contents can gradually penetrate into the paper material through it. Therefore, if one wishes to obtain a paper container having water-resistance equal to the paper container lined with the thermoplastic film as set forth above, an additional step will be required for sufficiently coating said cut edge with an appropriate material, for example, with a wax.

It will be noticed that even if the thermoplastic film is coated on only the interior or exterior wall surfaces of the container, the coated film layer will always face either the paper layer or the coated film layer or both if the upper periphery of the container body wall is outwardly curled or bent so as to form the mouth edge of the container. Hence, by applying ultrasonic waves to the mouth edge, the film layer present in the curled flanges forming the mouth edge may be welded to the opposite paper layer and/or film layer, resulting in a container mouth edge capable of resisting any deforming stress.

It has been well known to those skilled in the art that any thermoplastic film can be coated on a sheet of paper material with the aid of heat and pressure. Also, the thermoplastic materials are generally known. Examples of such thermoplastic materials are polyethylene, polypropylene, nylon, an ionomer resin and the like. Preferred thermoplastic materials which are used in the present invention are polyethylene, polypropylene and the ionomer resin.

While several embodiments of the invention have been shown and described in detail, it will be understood that the same are for illustration purpose only and not to be taken as a limitation of the invention, reference being had for this purpose to the appended claims.

What is claimed is:

1. A method for the manufacture of a paper container having a substantially non-deformable upper mouth edge comprising the steps of:
   blanking out a bottom panel component and a body component from a sheet of paper material having a coating of thermoplastic film applied to at least one side of said paper material, said body component having opposite side ends, an upper edge, a lower end and a lower edge;
   downwardly bending the peripheral edge of said bottom panel at right angles to the plane of the bottom panel to form a peripheral flange;
   positioning said peripheral flange of the bottom panel slightly above the lower edge of said container body component;
   rolling said body component so as to bring the opposite side ends of the container body component into slightly overlapping relationship so as to form a container body wall having a side seam extending in a longitudinal direction along the body wall;
   inwardly and upwardly bending the lower end of the container body wall along the peripheral flange of the bottom panel so as to encompass the peripheral flange of the bottom panel to thereby form a bottom seam having said plastic film layer on at least one inner side of said bottom seam;
   ultrasonically welding said bottom seam and said side seam by ultrasonic welding means;
   outwardly curling the upper circumferential edge of said container body portion to form a container mouth edge, said upper circumferential edge being outwardly curled to fold inwardly back on itself with said plastic film layer of said folded back edge being in face-to-face relationship with a surface portion of said upper circumferential edge to form an upper seam; and
   ultrasonically welding said upper seam by using ultrasonic welding means, thereby forming a substantially non-deformable ultrasonically welded upper mouth edge.

2. The method of claim 1 wherein said ultrasonic welding comprises applying ultrasonic waves to said bottom, side and upper seams with a static pressure on the order of from about 1 to 10 Kg/cm$^2$ being applied to said seams.

3. The method of claim 2 wherein said static pressure is from about 2 to about 5 Kg/cm$^2$.

4. The method of either of claims 2 or 3 wherein said ultrasonic waves are applied for a period of about 0.2 to about 3 seconds.

5. The method of claim 4 wherein said ultrasonic waves are applied for a period of about 0.3 to about 2 seconds.

6. The method of claim 1 wherein said ultrasonic welding comprises applying ultrasonic waves to said seams for a period of about 0.2 to about 3 seconds.

7. The method of claim 6 wherein said ultrasonic waves are applied for a period of about 0.3 to about 2 seconds.

8. The method of claim 1 wherein said outwardly curling step comprises folding said upper circumferential edge back twice on itself, and then ultrasonically welding the facing surfaces thereof.

9. The method of either of claims 1 or 8 wherein said thermoplastic film is on the surface of said paper material which forms the interior of said container.

10. The method of claim 9 wherein said film is exposed at the upper end of the container mouth edge and is undamaged during said ultrasonic welding.

11. The method of claim 9 wherein said thermoplastic film is on both sides of said paper material, said facing surfaces of said container mouth edge being facing thermoplastic film layers, said ultrasonic welding of said upper seams comprising only welding said facing thermoplastic film layers together.

12. The method of claim 11 wherein said film is exposed at the upper end of the container mouth edge and is undamaged during said ultrasonic welding.

13. The method of claim 1 wherein said seams are separately ultrasonically welded.

14. The method of claim 1 comprising softening said upper circumferential edge prior to said outwardly curling step.

* * * * *